United States Patent [19]
Reiger, Jr. et al.

[11] 3,974,553
[45] Aug. 17, 1976

[54] TURRET FOR WORKPIECE AND METHOD

[75] Inventors: Arthur C. Reiger, Jr.; Hyman B. Finegold, both of Dayton, Ohio

[73] Assignee: The Globe Tool and Engineeering Company, Dayton, Ohio

[22] Filed: Aug. 11, 1975

[21] Appl. No.: 603,745

Related U.S. Application Data

[62] Division of Ser. No. 376,518, July 5, 1973, Pat. No. 3,926,421.

[52] U.S. Cl. .......................... 29/38 C; 29/205 E; 51/108 R; 74/84 R; 90/11.44
[51] Int. Cl.² .................. B23P 23/00; F16H 27/04; B24B 5/00; B23C 3/28
[58] Field of Search .......... 29/38 C, 285 E; 51/108; 90/11.44; 74/84

[56] References Cited
UNITED STATES PATENTS

| | | | |
|---|---|---|---|
| 1,789,456 | 1/1931 | Blood | 29/38 C |
| 2,507,998 | 5/1950 | Russell | 51/108 |
| 2,786,360 | 3/1957 | Cameron | 74/84 |
| 2,800,038 | 7/1957 | Jonson | 74/822 |
| 2,953,069 | 9/1960 | Smith | 90/11.44 |
| 3,153,276 | 10/1964 | Herbkersman | 29/38 C |
| 3,616,512 | 11/1971 | Appenzeller et al. | 29/285 E |

FOREIGN PATENTS OR APPLICATIONS

| | | |
|---|---|---|
| 940,868 | 11/1963 | United Kingdom |

*Primary Examiner*—Harrison L. Hinson
*Attorney, Agent, or Firm*—Dybvig & Dybvig

[57] ABSTRACT

Automatic machinery for performing multiple operations on different parts of workpieces includes an incrementally rotating, workpiece supporting turret provided with three workpiece supports. Upon rotating of the turret, a workpiece loaded on a support located at a first position is indexed about the axis of the turret to a second position at which a first operation is performed thereon, then to a third, idle position. Continued rotation of the turret results in an index of the workpiece to the first position, then again to the second position at which a second operation is performed thereon. After the next index to the third position, the workpiece is unloaded from the support. As the turret is indexed, the workpiece is rotated relative to the turret whereupon the workpiece is oriented differently each time it reaches the second position causing the operations to take place on different parts of the workpiece. The workpiece is loaded on one of the three supports following every second index and a workpiece is unloaded from one of the supports following alternate indexes. An operation is performed on a workpiece following each index. In the specifically disclosed embodiment, the workpiece is a two pole stator frame which is to be provided with two identical pieces of insulation at diametrically opposed points on the stator frame. The insulation is delivered along a predetermined path by a delivery mechanism. Accordingly, each stator frame is rotated through a net angle of 180° relative to the turret between the two intervals in which it is located at the second position in order to place the appropriate parts of the stator frame in the predetermined insulation delivery path.

The disclosed mechanism includes means for rotating the turret and a planetary gear system for rotating the stator frame relative to the turret in order to present the proper portion of each stator frame at the operation station at each interval.

1 Claim, 8 Drawing Figures

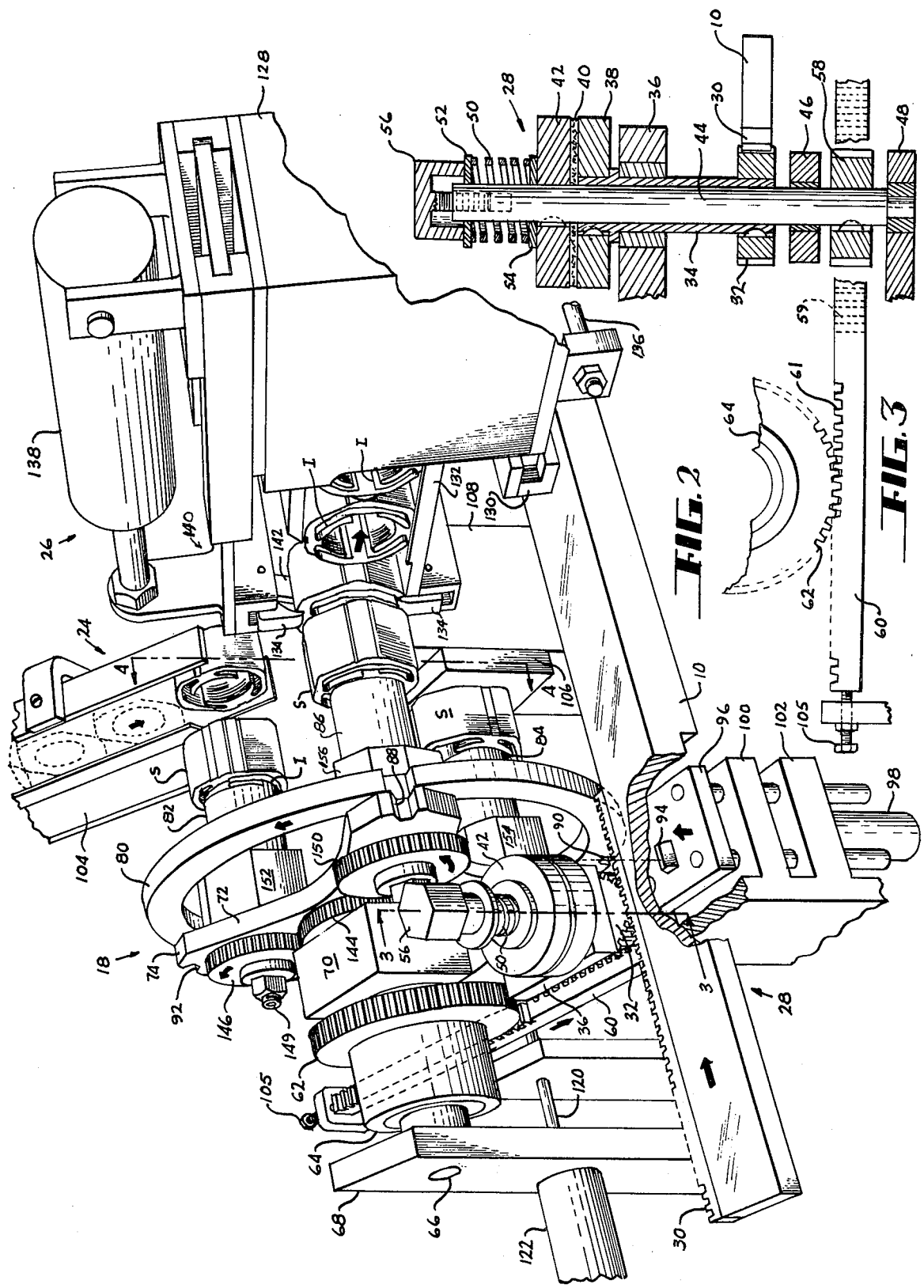

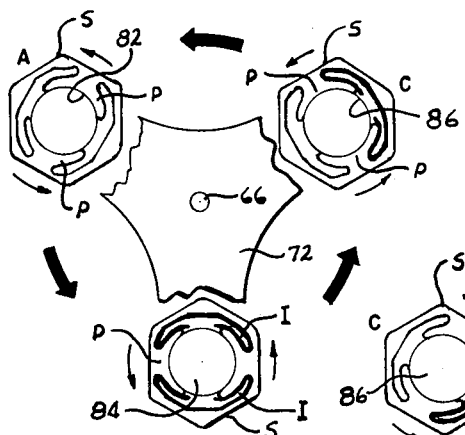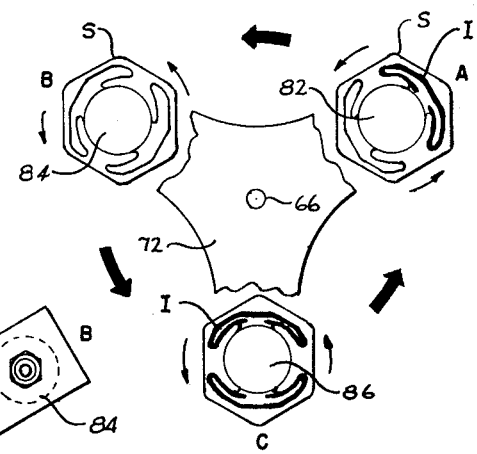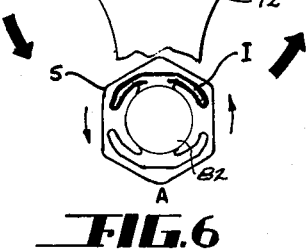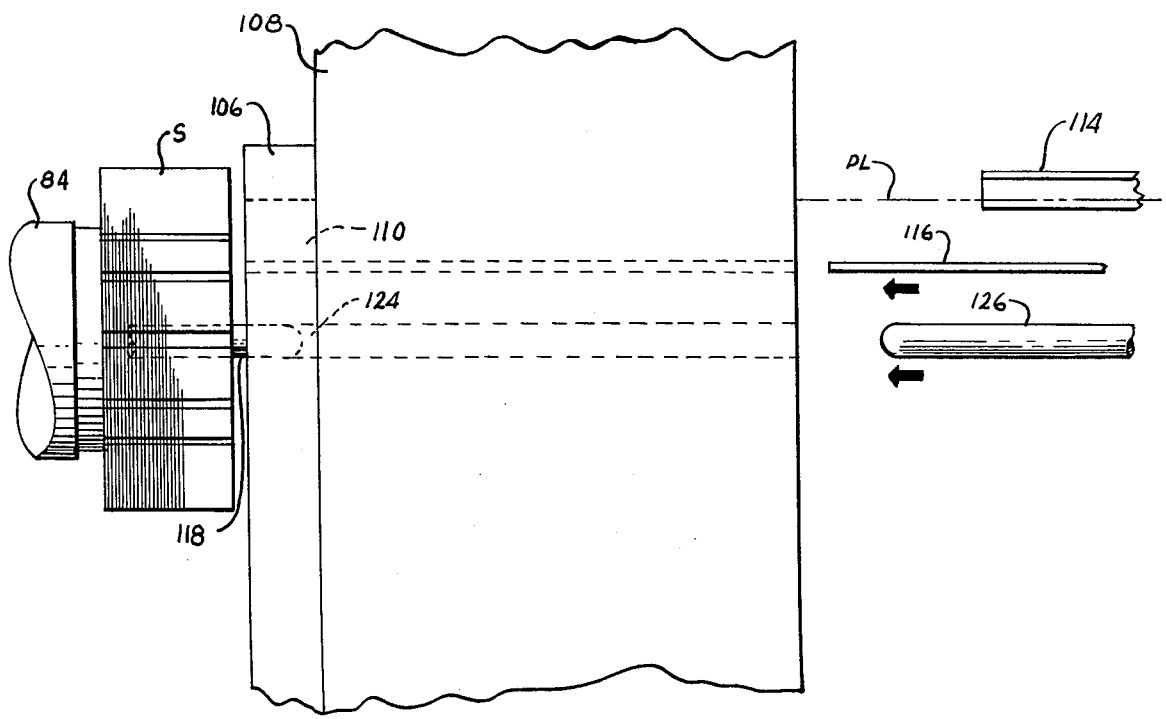

TURRET FOR WORKPIECE AND METHOD

This is a division of application Ser. No. 376,518 filed July 5, 1973 for TURRET FOR WORKPIECE AND METHOD now U.S. Pat. No. 3,926,421.

BACKGROUND OF THE INVENTION

This invention relates in general to a turret for a workpiece and a method. Although the invention may be generally useful in a variety of applications, it relates more specifically to a stator frame support turret for use in insulating stators, especially two-pole stators.

One type of two-pole stator insulating mechanism utilizes a constantly operating prime mover such as an electric motor driving delivery mechanism adapted to feed insulating sheets, cut from a spool of strip Mylar or the like, into the proper location relative to the stator frame. Two-pole stators require two insulating sheets on diametrically opposite sides of the frame. Due to the size of the insulating cutting and forming equipment relative to the stator frames, it is impractical to cut and form two pieces of insulation at the same time. Therefore, the machines cut, form and insert a first piece of insulation and then immediately thereafter insert a second piece of insulation. The insulation is delivered along a single, predetermined path. Accordingly, between the insertion of the first and second pieces of insulation, the stator frame must be rotated through 180° relative to the insulation delivery mechanism. While the stator frame is being rotated, the mechanism for inserting the insulation is disabled or declutched from the prime mover. Although this type of apparatus is entirely satisfactory, the production rate for such equipment is limited due to the fact that the insulation delivery mechanism is not operating during a portion of each cycle.

SUMMARY OF THE INVENTION

A surprisingly substantial increase in production rate can be obtained by driving the insulation delivery mechanism continuously without interruption. Fingers used to move the insulation from the forming apparatus into the stator frames operate with a harmonic back and forth motion. On each forward stroke of the mechanism an insulating piece is inserted in the proper place in the stator frame. In order to avoid any discontinuity in the operation of the insulation delivery mechanism, a turret is provided which operates synchronously with the delivery mechanism, the turret being designed to present a portion of the stator frame which is to be provided with insulation at a working station adjacent the delivery mechanism upon each forward stroke of the delivery mechanism. Each stator frame is presented at the working station two times. During the interval between which each stator frame is at the working station, the stator frame is rotated relative to the turret through an angle which is an odd integral multiple of 180°. Accordingly, the stator frame will have been rotated through a net angle of 180° relative to the turret between the intervals in which it is located at the working station.

In the preferred embodiment, the turret has three stator frame supports located 120° apart and the turret is rotated or indexed through 120° during each cycle of its operation. Each stator frame support is rotated through 180° relative to the turret during each turret index. Preferably a planetary gear system including a planet gear affixed to each support and a sun gear fixed relative to the bed of the machine are utilized to rotate the supports. The stator load mechanism is operated after every alternate index and the unload mechanism is operated after the other indexes. Conventional machine controls can be utilized to cause the alternate operation of the load and unload devices. It is readily apparent that the turret could have any odd number of stator frame supports, three being the simplest form.

It will be appreciated that the invention described herein may be utilized in machines other than stator insulating machines and that the principles of construction and operation may be applicable to any workpiece upon which essentially identical operations are to be performed on spaced parts thereof, especially when the spaced parts are located at common distances from the workpiece centerlines.

BRIEF DESCRIPTION OF THE DRAWINGS

FIG. 2 is a perspective view of a portion of the machine of FIG. 1 including parts of the load and unload mechanisms, the turret and turret drive mechanism, and stator frames handled by the load mechanism, the turret and the unload mechanism. In FIG. 2, parts have been broken away and other parts omitted or shown in simplified form for convenience of description.

FIG. 3 is a cross sectional view with parts broken away of a portion of the turret drive mechanism taken along section 3—3 of FIG. 2.

FIGS. 5, 6 and 7 schematically illustrate the sequence of operation of the turret.

FIG. 8 is a simplified elevational view of a portion of the apparatus for forming the insulation and inserting the insulation into a stator frame.

DESCRIPTION OF THE PREFERRED EMBODIMENT

Referring first to FIG. 5, the invention described herein is embodied in a machine adapted to insert insulating strips designated I, made from Mylar or the like, in stator frames S for 2-pole stators having pole pieces P. As well known to those versed in the art, the stator frames S are formed from plural laminations which are punched out to provide the pole pieces P, the insulating strips I being utilized to insulate between the coils of wire and the metal from which the laminations are punched. Each stator frame S requires two insulating strips, the two identical insulating strips located 180° apart and spaced equally from the centerline of the stator frame.

Figure 1:
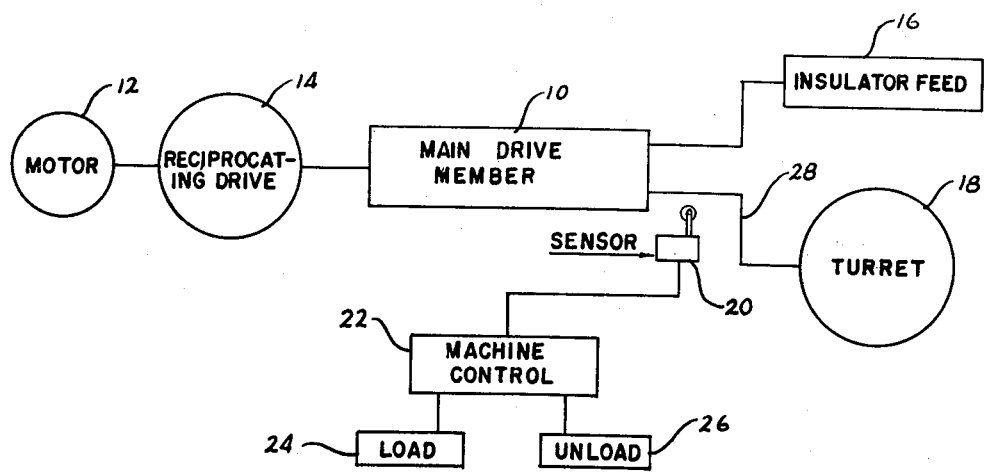
FIG. 1 is a simplified block diagram of a stator insulating machine made in accordance with this invention.

With reference to FIG. 1, a machine of the type in which this invention is incorporated may include a harmonically driven main drive member 10 powered by a motor 12 connected to the main drive member 10 by a conventional rotary to reciprocating drive mechanism 14, such as a bell crank mechanism. The terminology "harmonic" in this case refers to a constant reciprocating back and forth motion of the drive member 10 which continues so long as the motor 12 is in operation. The main drive member 10 is utilized to operate an insulator delivery or feed mechanism 16 and to operate a stator frame supporting turret 18. As those familiar with the art will appreciate, the main drive member 10 could also be used to operate the appropriate cutting and forming mechanisms which convert a strip of insulating material into the insulators inserted by the feed mechanism 16. The invention herein is directed to the turret 18 and the manner in which the turret 18 is driven by the main drive member 10. Hence the details of the mechanism for driving the main drive member 10 as well as the insulator feed mechanism 16 and the other parts of the machine mentioned above are not disclosed in detail herein. In general such other parts are old and well known to those skilled in the art. Also diagrammed in FIG. 1 is a sensor 20 which may be a simple limit switch or several limit switches sensing the movements of the main drive member 10 and/or other parts of the machine. Conventional machine control apparatus designated by the box 22 can be used for controlling the operations of various parts of the machine including the stator load mechanism indicated at 24 and the stator unload mechanism generally designated 26. In FIG. 1 the straight lines connecting the motor 12, the reciprocating drive 14, the main drive member 10, the insulator feed 16 and the turret 18 all represent mechanical parts. That is, the connections between all these members are preferably purely mechanical connections which, with the exception of the mechanism connecting the main drive member 10 and the turret 18 indicated by line 28, are not illustrated or described herein. Of course, those familiar with modern automatic machines will readily recognize that not all operating parts of the machine need to be mechanically interconnected but could be linked by servo systems or other electrical or electronic devices.

FIG. 2 illustrates preferred forms of the main drive member 10, the turret 18, a portion of the load mechanism 24, a portion of the unload mechanism 26 and the mechanical drive 28 connecting the main drive member 10 and the turret 18. FIG. 3 illustrates portions of the mechanical drive 28 interconnecting the main drive member 10 and the turret 18 in greater detail. With reference to these figures, the main drive member 10 consists of a bar which, as previously noted, harmonically reciprocates back and forth, that is, from right to left as viewed in FIG. 2. Affixed along a left end edge of the main drive member 10 is a rack 30 having teeth engaging a pinion 32 keyed, as seen in FIG. 3, to a hollow shaft 34 journalled for rotation in a fixed horizontal plate 36 to which a first clutch plate 38 is also keyed. Mounted on top of the first clutch plate 38 is a friction disc 40 and a second clutch plate 42, the latter being keyed to a solid shaft 44 which passes through the hollow shaft 34 and is journalled at 46 and 48 to fixed parts of the machine. As apparent, the array of the clutch plates 28 and 42 and the friction disc 40 provides a friction drive between the hollow shaft 34 driven by the main drive member 10 and the solid shaft 44. The friction clutch thus provided can be adjusted as conventional by a coil spring 50 trapped between washers 52 and 54. The tension on the coil spring 50 is adjusted by an adjusting cap 56 having a central stud threaded into an aperture in the upper end of the solid shaft 44. The shaft 44 is keyed to a drive pinion 58 having teeth meshing with rack teeth 59 formed on a side of a drive bar 60. Bar 60 is supported and guided in any suitable manner for movement below and transverse to the main drive member 10. Other rack teeth 61 formed on top of the bar 60 drive a pinion gear 62 connected to a one-way or sprague clutch 64 that drives a turret shaft 66. The turret shaft 66 is journalled for rotation in a support plate 68 and a pillow block 70, both of which are affixed relative to the bed of the machine.

The turret 18, in the form illustrated in FIG. 2, consists of a spider 72 having three legs 74, 76 and 78 (see also FIG. 4) the outer ends of which are interconnected by a ring 80. The center axis of the spider 72 is connected for rotation with the turret shaft 66 in any suitable fashion.

Journalled for rotation on the spider legs 74, 76 and 78 are mandrels 82, 84 and 86, respectively. The axes of rotation of the mandrels 82, 84 and 86 are equally circumferentially spaced by 120° and are equally spaced from the longitudinal axis of the turret shaft 66 which is coaxial with the ring 80 and the spider 72. As will be described immediately below, the turret 18 is repeatedly driven through increments of 120° so that after each cycle of movement thereof there will be a mandrel located at each of three positions, generally at 10 o'clock, 2 o'clock and 6 o'clock. The ring 80 and the outer ends of the spider legs 74, 76 and 78 are provided with aligned axially extending notches 88, 90 and 92 which, when located in the 6 o'clock position, are adapted to receive a stop dog 94 mounted on a horizontal plate 96 driven by an air cylinder 98 and guided by plates 100 and 102 fixed to a support plate 103 upon which the pillow block 70 may be mounted. Here it may be noted that only the more important moving parts of the machine are illustrated in detail. Parts of the machine fixed to the bed such as the support plate 103 and the manner in which they are connected to the machine bed are not illustrated in detail, such being unimportant to the invention and well within the ability of those skilled in the art to provide.

The operation of the apparatus as thus far described is as follows. As previously mentioned, the main drive member 10 reciprocates harmonically. Upon each stroke of the member 10 in either direction, that is, either to the right or to the left as viewed in FIG. 2, the solid shaft 44 is driven through the friction clutch provided by the members 38, 40 and 42 thereby to drive the drive bar 60 either to the right or to the left as viewed in FIG. 3. Movement of the drive bar 60 either to the right or to the left results in rotation of the gear 62 respectively in either the counterclockwise or the clockwise direction. The one-way clutch 64 is adapted to drive the turret shaft 66 only in the counterclockwise direction. Accordingly, the turret shaft 66 is only rotated upon each reverse stroke of the main drive member 10, that is on each stroke of the member 10 to the right as viewed in FIG. 2. Since the spider 72 is directly connected to the turret shaft 66, it is rotated invariably in a counterclockwise direction and only upon each reverse stroke of the main drive member 10.

Immediately prior to each index of the turret, the stop dog 94 is retracted by energization of the actuator 98 from the notch in the periphery of the turret at the 6 o'clock position. The turret is thus free to rotate and upon movement of the main drive member 10 to the right, as viewed in FIG. 2, the turret is rotated in the counterclockwise direction. As soon as the turret begins to rotate, the actuator 98 biases the stop dog 94 back into engagement with the periphery of the ring 80 where it remains until the turret has been rotated or indexed through 120° whereupon the stop dog 94 falls into the next notch to stop the rotation of the turret. The gearing between the rack 30 on the main drive member 10 and the gear 62 is so designed that the gear 62 would be rotated through an angle slightly in excess of 120° upon each return reverse stroke of the drive member 10. However, the stop dog 94 prevents rotation of the turret through an angle in excess of 120°. Therefore, the friction clutch provided by the members 38, 40 and 42 slips as the main drive member 10 approaches the end of its rearward movement. In order to insure that the parts of the drive 28 are properly positioned prior to the reverse movement of the drive member 10, an adjustable stop 105 is provided for stopping the drive bar 60 near the end of each forward stroke of the main drive member 10. Of course, as soon as the drive bar 60 strikes the stop 105, the friction clutch will again slip.

Figure 4:
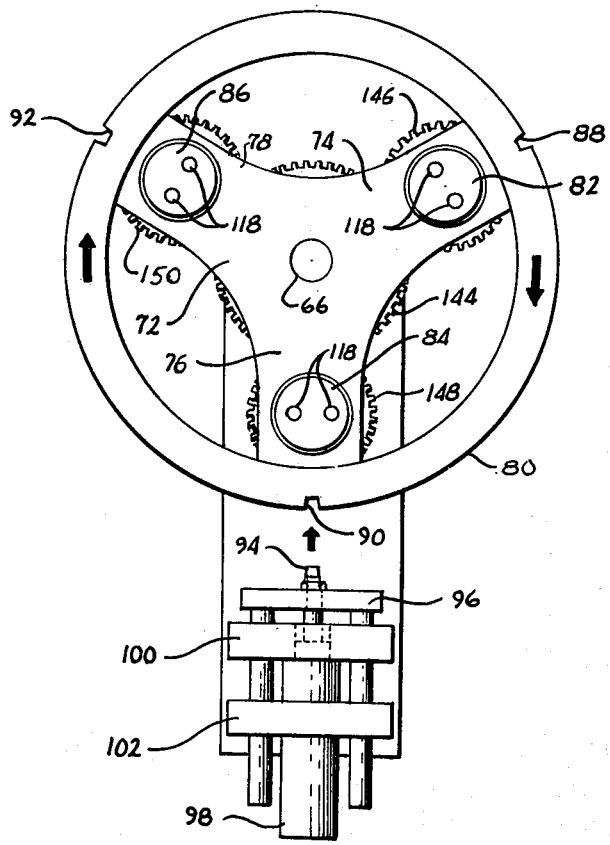
FIG. 4 is an elevational view of the turret as viewed in the direction of arrows 4—4 of FIG. 3.

In FIGS. 2 and 4, the mandrel 82 is shown at the load station, the mandrel 84 at the working station, and the mandrel 86 at the unload station. The load mechanism 24 includes a load ramp 104 receiving stator frames to be provided with insulation. The load mechanism also includes devices (not illustrated) to move stator frames from the lower end of the load ramp 104 onto a confronting mandrel. The mandrel located at the 6 o'clock position, i.e. mandrel 84 in FIGS. 2 and 4, is located at the working station in confronting relation to a nosepiece 106 of an insulation cutting and forming device housed within a housing 108, the details of which are unimportant to this invention, aside from the fact that the nosepiece 106 has a slot as indicated at 110 in FIG. 8, shaped in the form of an insulator I, to permit an insulator to be pushed therethrough from the forming mechanism into the stator frame. The cutting and forming mechanism within housing 108 cuts each insulator I from a strip of insulating material, such as Mylar, fed from a chute 114 along a plane designated PL from a strip supply reel (not shown). After the insulating material is cut and formed, it is forced through the slot 110 by plural push rods or ram fingers 116, only one of which is indicated in FIG. 8. The push rods or fingers 116 are driven by the main drive member 10 through gearing or the like (not shown) so as to force a cut and formed insulator I through the slot 110 during each forward stroke of the drive member 10, that is the stroke to the left as viewed in FIG. 2.

Each mandrel 82, 84 and 86 is provided with suitable guide surfaces (not shown) engaging the confronting tips of the stator pole pieces P so as to accurately align the stators relative to the mandrels. In order to insure accurate alignment of the mandrels relative to the nosepiece 106 during the interval in which an insulator is inserted into a stator, each mandrel is also provided with a pair of guide pins 118 (FIGS. 4 and 8). The guide pins are connected together in any suitable fashion and are adapted to be driven by a piston 120 of an air actuator 122 (FIG. 2) into holes 124 in the nosepiece 106 when a mandrel reaches the working station and are retracted by spring means (not shown) just prior to the mandrel leaving the working station. To insure retraction of the pins 118, another pair of pins 126, only one of which can be seen in FIG. 8, enters the opposite side of the nosepiece 106, and, overcoming the bias provided by the air actuator 122, drives the pins 118 out of the nosepiece 106 when the insulation has been inserted into a stator frame.

Although the construction of the unload mechanism 26, per se, is unimportant, a typical type of unload mechanism usable with this invention is partly illustrated in FIG. 2. The unload mechanism 26 may comprise a carriage 128 slidable in one or more ways 130 along an axis parallel to the axis of rotation of the turret 18 and the axis of reciprocation of the main drive member 10. The carriage 128 supports an unload ramp 132 onto which the stator frames S provided with insulating strips are placed upon removal from the mandrels when located at the unload station. The carriage 128 supports the pair of spring biased fingers 134. When a stator frame S is to be removed from the mandrel confronting the lower end of the ramp 132, the entire carriage 128 is moved by an actuator (not shown) having a piston rod 136 toward the turret 18 with the spring biased fingers 134 sliding over the stator frame to be unloaded. The carriage 128 is then retracted back to the position shown in FIG. 2 whereupon the fingers 134 strip the stator frame off the mandrel and onto the ramp 132. Subsequently an air actuator 138 mounted on top of the carriage 128 and operating longitudinally of the unload ramp 130, drives a slide assembly 140 including a pusher plate 142 mounted upon the same support as the upper one of the fingers 134 to move the newly unloaded stator frame upwardly along the ramp 130 over spring biased stop means (not shown) which prevents the stator frame from sliding back down the ramp 132 thereby to provide a space at the lower end of the ramp 132 for the next stator to be unloaded. As apparent, this operation can be repeated each time a stator frame is to be removed from a mandrel.

With reference to FIGS. 2 and 5–7, it will be noted that if an imaginary plane is passed through the center of each stator frame S midway between the pole pieces P, the imaginary plane for the stator frames at the 2 o'clock and 10 o'clock positions will lie at angles of approximately 30° relative to horizontal and passing through the axis of the turret shaft 66. These planes are intersected by the corresponding imaginary plane which passes vertically through the stator frame at the 6 o'clock position. These locations of the stator frames are invariably the same after each index of the turret. The peripheries of the particular stator frames S illustrated in the drawings conveniently have flats parallel to these planes. For this reason the load ramp 104 and the unload ramp 132 are located at 30° relative to the horizontal.

As will be described further below, each stator frame is located at the 6 o'clock or working position two times. The first time a stator frame is located at the 6 o'clock position an insulator I is inserted therein above the horizontal centerline thereof. The second time it is located at the 6 o'clock position the stator frame has been rotated through an angle of 180° in order to orient the opposite side of the stator frame in position to receive the second insulator. The stator frames are positioned as best shown in FIGS. 5, 6 and 7 relative to the spider 72 by use of a planetary gear system which as shown in FIGS. 2 and 4 consists of a sun gear 144 affixed to the pillow block 70 and three planet gears 146, 148 and 150 which are keyed, respectively, to the shafts upon which the mandrels 82, 84 and 86 are mounted. Only one such shaft, designated 149, can be seen in the drawings. These shafts are journalled for rotation in bearing housings 152, 154 and 156, respectively, mounted upon the spider legs 74, 76 and 78, respectively. The ratio of the planet gear teeth to the sun gear teeth is such that for each 120° index of the turret spider 72 each of the planet gears 146, 148 and 150 are rotated 180° relative to the turret spider. For this purpose the sun gear 144 could have 78 teeth and each planet gear would then have 52 teeth. The mandrels 82, 84 and 86 are affixed to the mandrel shafts for rotation therewith. Since the stator frames S are non-rotatable relative to the mandrels, the stator frames S are rotated through 180° each time the turret is indexed through 120°.

The sequence of operation of the turret mechanism is as follows. When the machine is first placed into operation, there is an interval of time during which one or more of the mandrels is not provided with a stator. After the machine has been in operation for a period of time, there will be intervals in which all three mandrels 82, 84 and 85 will have stators on them. An example of such a condition is illustrated in FIG. 5 wherein a stator with no insulation has just been loaded onto the mandrel 82 at the 10 o'clock position. The stator frame S on the mandrel 84 at the 6 o'clock position has just received the upper one of the two insulators I and the stator S on the mandrel 86 at the 2 o'clock position has been provided with only one insulator I. This condition is also illustrated in FIG. 2. Immediately after the parts have reached the position illustrated in FIGS. 2 and 5, the main drive member 10 will be reversed or retracted, that is, moved to the right as viewed in FIG. 2, as indicated by the arrow thereon, and the spider 72 with the mandrels 82, 84 and 86 will be indexed 120° in a counterclockwise direction. Accordingly, the mandrels 82, 84 and 86 will be translated to the positions thereof shown in FIG. 6 wherein it will be noted that each stator S has been rotated through 180° relative to the spider 72. When the main drive member 10 is subsequently moved in the forward direction, that is to the left as viewed in FIG. 2, an insulator I will be pushed by the ram fingers 116 into the upper portion of the stator frame S on the mandrel 82. At approximately the same time the unload carriage 130 will be operated to strip the stator frame S from the mandrel 84 at the 2 o'clock position. It will be noted that just prior to the time the parts reach the position of FIG. 5, the load mechanism 24 was operated. When the parts reach the FIG. 6 position, the load mechanism is not operated but the unload mechanism is operated. Therefore, the stator frame S on the mandrel 86 at the 10 o'clock position in FIG. 6 is at an idle station.

After the aforedescribed operations have taken place and the main drive member 10 is again reversed, the parts will be indexed to the position illustrated in FIG. 7. Immediately after the spider reaches the position of FIG. 7, the load mechanism is operated to insert a new stator onto the mandrel 84 now at the 2 o'clock position and the main drive member 10 is moved in the forward direction to insert an insulator on the upper portion of the stator S on the mandrel 86 at the 6 o'clock position. Since there are now two insulators in the stator frame S on the mandrel 86, that particular stator frame will be removed following the next index.

The stator frame S on the mandrel 82 at the 10 o'clock position in FIG. 7 is at an idle station since it has only received one insulator. In FIGS. 5–7, the letters A, B and C are marked adjacent the ends of respective spider legs to better indicate the progression of turret index.

Those familiar with automatic machinery of this type will readily appreciate that the cycle time of the constantly, harmonically reciprocating main drive member 10 can be so established to permit the operation of the load mechanism after every other index and the unload mechanisms following alternate indexes and at the same time permit the insertion of insulators into the stator frames after each index. The same operating conditions would obtain whenever the turret has an odd number of supports. The three supports are preferable as illustrated, for use with stator insulators because additional supports would increase the cost of the turret without increasing speed or efficiency. There may be occasions when five, seven or some other odd number of supports would be preferred. Machines utilizing the aforedescribed principles of operation can readily be operated at a production rate increase of 50 percent over machines in which the movements of the ram fingers are interrupted while stator frames are rotated through 180° at a working station.

Although the presently preferred embodiment of this invention has been described, it will be understood that within the puriview of this invention various changes may be made within the scope of the appended claims.

Having thus described our invention, we claim:

1. A machine for performing operations on workpieces wherein two essentially identical operations are performed on each workpiece, a turret having an odd number of workpiece supports, means for repeatedly indexing said turret about a predetermined axis through an angle equal to 360° divided by the number of workpiece supports, means for rotating said workpiece supports relative to said turret during each index of said turret, a load mechanism for loading a workpiece on each of said workpiece supports when located at a predetermined first position, means for performing the desired operation on said workpieces when located at a predetermined second position, an unload mechanism for receiving a workpiece located at a third position, harmonically operating means for performing said operations on workpieces located at said second position after each index of said turret, and machine control means operating said load mechanism after every other index of said turret and operating said unload mechanism after every other index of said turret, the unloading occurring alternately with the loading.

* * * * *